Nov. 20, 1928.
H. B. P. WRENN
CABLE SUPPORT
Filed Nov. 28, 1924
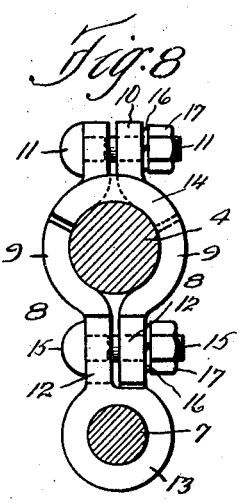
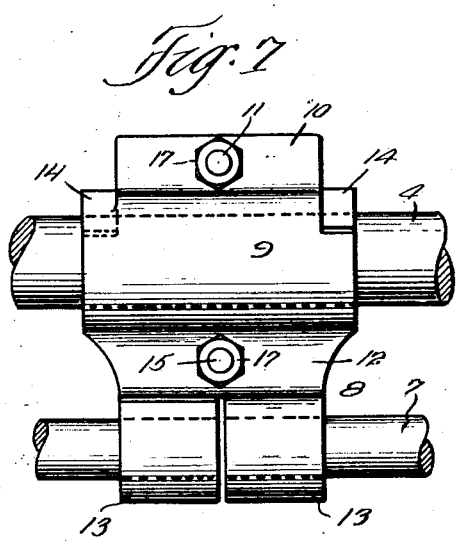
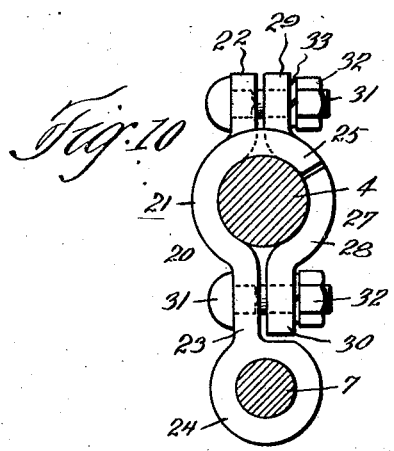
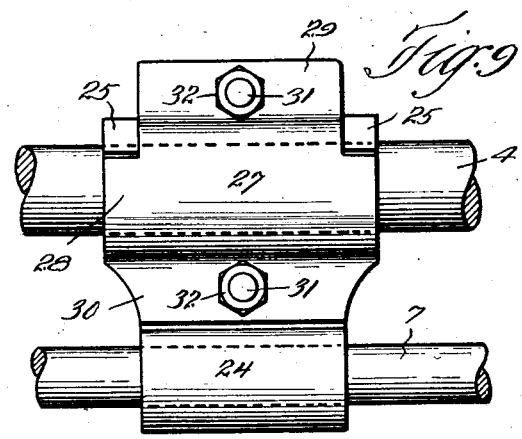
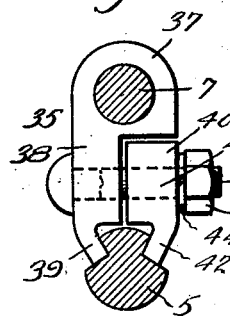
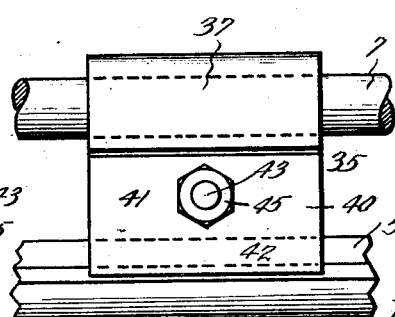

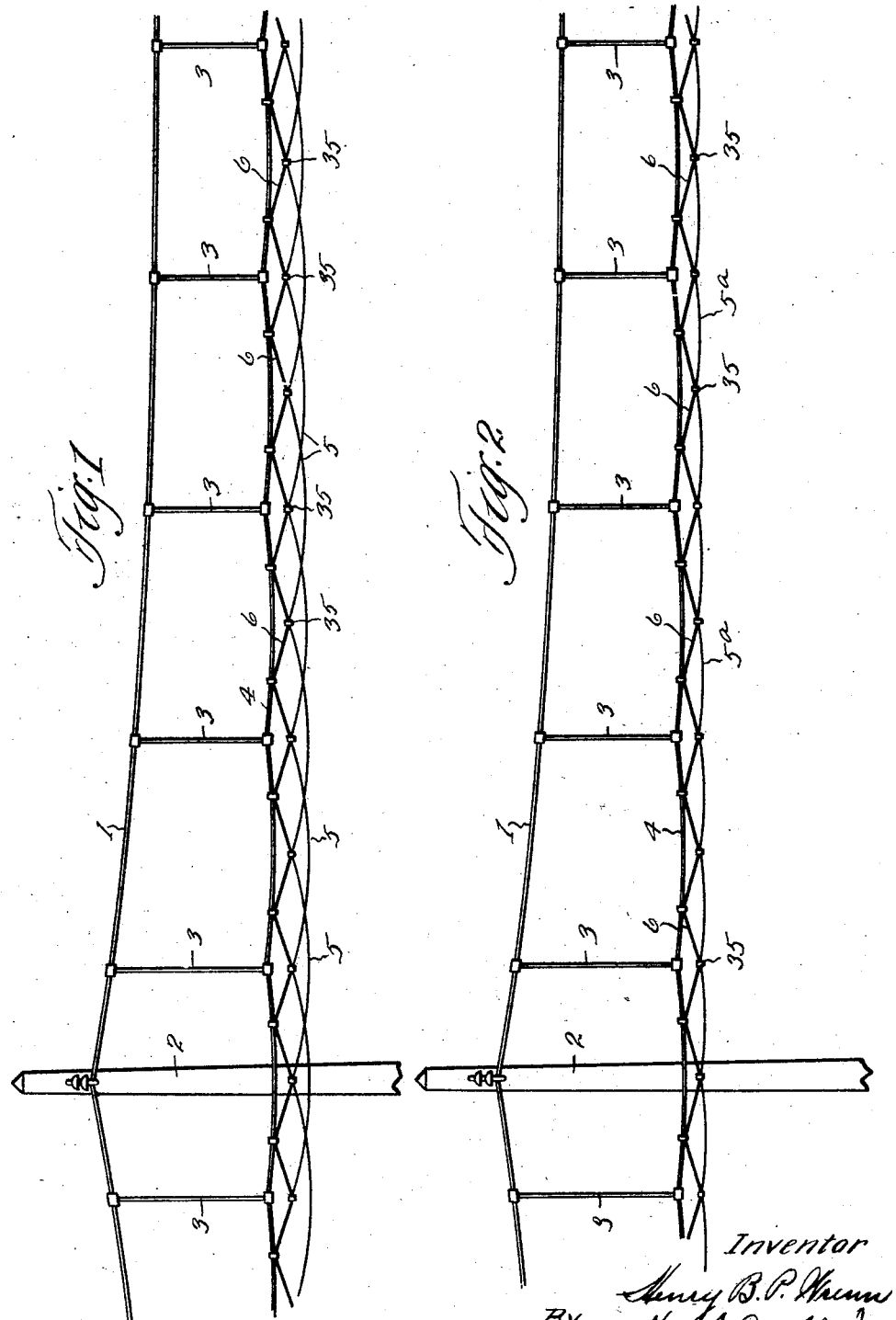

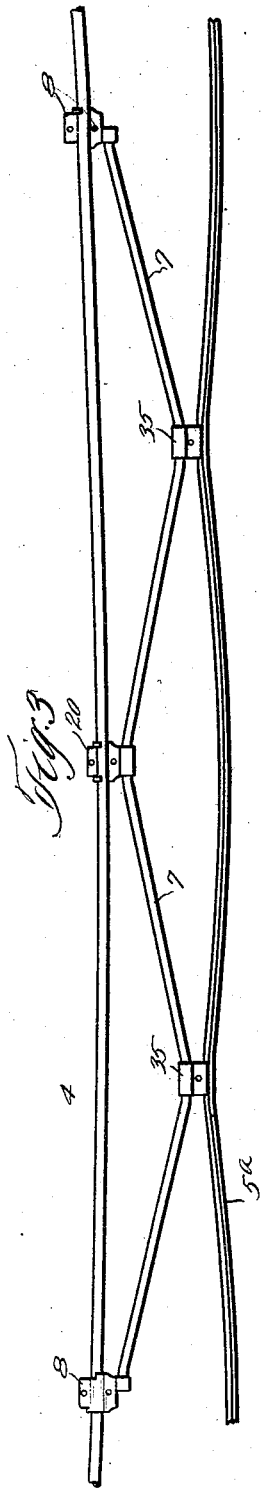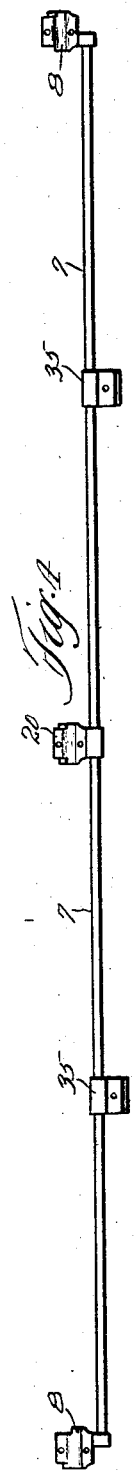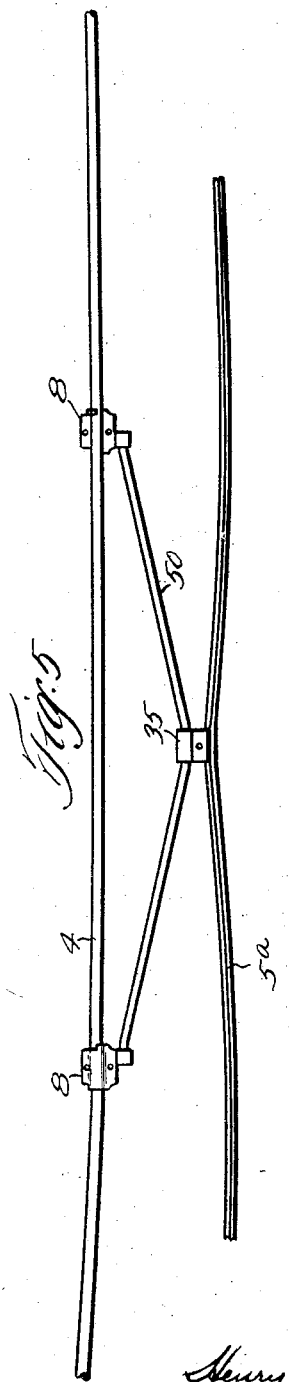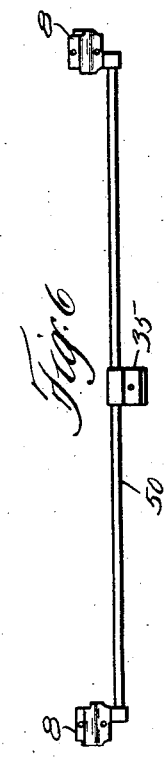

Patented Nov. 20, 1928.

1,692,104

UNITED STATES PATENT OFFICE.

HENRY B. P. WRENN, OF CLEVELAND, OHIO; O. P. MOON, ADMINISTRATOR OF HENRY B. P. WRENN, DECEASED, ASSIGNOR TO ARTHUR M. HAHN, OF AURORA HILLS, VIRGINIA.

CABLE SUPPORT.

Application filed November 28, 1924. Serial No. 752,608.

This invention relates to overhead suspension systems wherein one or more contact wires are supported from a catenary structure and the present invention is directed more particularly to a novel and improved form of lacing for connecting such contact wires to the catenary structure.

Heretofore, when using a lacing to support the contact wire from the catenary structure, it has been the custom to employ a continuous lacing cable arranged in zigzag form between the contact wire and structure, such cable being clamped at definite intervals alternately to the contact wire and structure. In view of the fact that the lacing is a continuous cable (in order to increase the conductivity of the system and reduce joints to a minimum) it necessitates a large crew of men to erect the system and fasten the wires in place and then adjust the wires and cables so that the contact wire will be in substantially parallel relation to the track beneath. In addition, a continuous cable is difficult to handle so as to prevent twisting and introducing undersirable stresses and strains in the system.

It is the primary object of the present invention to provide an improved type of lacing which shall be in sectional form so as to be easily handled and which shall greatly expedite the erection of an overhead system and require a minimum number of men for such erection.

Another object is to provide a lacing of this character which shall materially reduce the number of clamp joints ordinarily present in the laced type of suspension, and hence greatly increase the conductivity of the system as a whole.

A further object is to provide an improved type of lacing which shall provide a positive and yielding form of connection between the contact wires and the catenary system so that all "hard spots" are eliminated and arcing and sparking is reduced to a minimum.

A still further object is to provide a lacing of the aforesaid character which shall be simple in construction, inexpensive to manufacture and which may be easily and quickly installed.

With these and other objects in view the invention consists in the various novel features of construction and arrangement or combination, all of which will be fully described hereinafter and pointed out in the appended claims.

In the drawings accompanying and forming a part of this application Fig. 1 is a side elevation of a portion of an overhead suspension system showing my improved lacing supporting two contact wires, Fig. 2 is a similar view but showing the lacing supporting a single contact wire; Fig. 3 is an enlarged detail elevation of one section of the lacing showing the same in position; Fig. 4 is an elevation of a lacing section detached from the system; Figs. 5 and 6 are views similar to Figs. 3 and 4 respectively, but showing a modified section of lacing; Figs. 7 and 8 are respectively side and end elevations of the clamp unit which is used at the ends of the lacing sections; Figs. 9 and 10 are similar views but showing a form of clamp as used at the central portion of the lacing shown in Figs. 3 and 4; and Figs. 11 and 12 are side and end elevations respectively of the clamp which connects the lacing with the contact wire.

Describing the various parts by reference characters and referring to Figs. 1 and 2, 1 denotes a suspension cable supported in any suitable manner as by means of the poles 2. Depending from this cable are a plurality of hangers 3 which are connected at their lower ends to a feeder cable 4. The feeder cable in turn supports a plurality of contact wires 5, as shown in Fig. 1, or a single contact wire 5$^a$, as shown in Fig. 2, by means of my improved lacing denoted generally at 6.

Referring particularly to Fig. 1, it will be noted that the contact wires 5 are arranged in a series of freely suspended overlapping loops similar to the arrangement disclosed in the reissue patent of myself and Aloysius S. O'Donoghue No. 15,876, dated July 22, 1924. In the present instance, however, the lacing 6 is used to support the contact wire or wires instead of clamping said wires directly to the feeder cable 4, and a slightly different spacing arrangement between the hangers and points of connection of the lacing to the feeder cable is employed, such arrangement being more fully described hereinafter.

One section of lacing is shown in Figs. 3 and 4 and comprises a length of flexible conductor 7 to each end of which is attached one half of a clamping device which is shown in detail in Figs. 7 and 8. Each half of this clamping device is identical in construction and consists of an arcuate portion 9 which is adapted to closely embrace the feeder cable 4, an upwardly extending lug 10 having an aperture therethrough to receive a bolt 11, and a downwardly extending flattened portion 12, which is provided with an integral cable terminal or socket 13. It will be noted that the lug 10 is of less width than the arcuate portion 9 so that the metal between one end of said lug and the end of the body portion may be deflected over to form a hook 14, while at the opposite end, the metal may be removed to permit the hook of the cooperating clamp member to seat therein. It will also be noted that the socket or terminal 13 of each member is substantially one half the width of the clamp element and is located to one side thereof so that the socket or terminal of the cooperating clamp element will lie in alignment therewith when the clamping elements are fastened together. A bolt 15 extends through the flattened portions 12 of each element and each of bolts 11 and 15 is fitted with a lock washer 16 and a nut 17 so that the clamping elements may be drawn snugly about the cable 4.

At substantially the mid point of the flexible conductor 7, there is placed an element 20 of a clamp device shown in detail in Figs. 9 and 10. This element is formed with an arcuate portion 21 which is adapted to embrace cable 4, an upstanding lug 22, and a downwardly projecting flattened portion 23 which terminates in a cable terminal or socket 24. The upstanding lug 22 is preferably of less width than arcuate portion 21 so that suitable hooks 25 may be formed, one on each end of the arcuate portion, so that the element may be hung on the cable 4 during the erection of the system as will be explained hereinafter. Cooperating with element 20 is a clamping element 27 having an arcuate portion 28, an upstanding lug 29 and a downwardly extending flattened portion 30. Elements 20 and 27 are clamped to cable 4 by means of bolts 31 and nuts 32, suitable lock washers 33 serving to maintain the parts in locked position.

Interposed between each of clamp elements 8 and 20 is a contact wire clamp indicated generally at 35 which is shown in detail in Figs. 11 and 12. One element of this clamp comprises a socket or terminal portion 37 and a downwardly extending flattened portion 38 which terminates in an inwardly directed lug 39. Referring to Fig. 12, it will be noted that the flattened portion 38 is located to one side of terminal 37 so as to define a recess into which is adapted to fit the cooperating clamp element 40. This element is formed with a flattened portion 41 and an inwardly directed lug 42. The elements are clamped together by a bolt 43 having a lock washer 44 and nut 45 applied thereto which serve to draw the lugs 39 and 42 into light engagement with the contact wire 5.

In making up a section of lacing as above described, the flexible conductor 7 is inserted through the socket or terminal portions of each of the clamp elements and these elements are spaced thereon as previously described. The cable and terminal portions are then united in any suitable manner but preferably by what is termed a drop forged connection, that is, the cable and terminal portions are subjected to a welding heat under pressure so that the metal of the conductor and terminal flow to form a homogeneous joint. This type of connection provides maximum conductivity and prevents corrosion which would introduce resistance into the system.

In erecting a system with my improved lacing it is only necessary for the lineman to measure off definite distances along the feeder cable 4 where the clamp elements 8 and 20 are to be located. A cable section is then hung in position, the hooks 14 of elements 8 and hooks 25 of element 20 facilitating the location of the section at the proper place on the feeder cable. The cooperating clamp members are then applied to the respective elements and locked in position. If the erection of the system is proceeding in a direction of left to right as viewed in Figs. 1 or 2, the clamp element 8 on the right hand end of the section of lacing is locked in position by positioning a second section of lacing on the feeder cable so that the clamp element on the left hand end of said second section will cooperate with the clamp element on the right hand end of the preceding section to form a complete clamp device.

It will be noted from Figs. 1 and 2, that the feeder cable 4 hangs in a series of catenary loops between the hangers 3, and the points where the feeder cable is attached to the hangers are slightly higher than any other points along the feeder cable. In order that the contact wire or wires may hang in a series of freely suspended loops which are tangent to a line parallel with the track, I preferably arrange the spacing of hangers 3 and the spacing of clamp sections 8, 20 and 8 on the lacing in such manner that the distance between adjacent points of connection of the lacing clamps will each be substantially one half of the distance between adjacent hangers, and the distance between adjacent points of connection of the lacing clamps 35 with the contact wire or wires will be substantially one half the distance between adjacent hangers, or in such manner that the distance from a hanger to an adjacent lacing clamp will be substantially one half the distance between adjacent lacing clamps on the feeder cable. The lacing is then connected so that a contact wire clamp 35 will be located beneath each hanger and a clamp 8 or 20 will be located with respect to its nearest hanger 3, a distance equal substantially to one fourth of the total distance between adjacent hangers. With this arrangement the contact wire clamps 35 will all be tangent to a line which is parallel to the track beneath the system, and all hard spots are eliminated so that a pantograph will pass smoothly along the contact wire or wires without arcing or sparking. The lacing sections in this instance may be made up in one size with respect to length and spacing of clamp elements thereon and the lineman need only determine the points of attachment of the clamps along the feeder cable 4, hence the system may be easily and quickly erected and readjustment of the lacing or clamps is unnecessary as in the case of a continuous lacing.

In Figs. 5 and 6 I have shown a modified form of lacing section. This section comprises a length 50 of flexible conductor somewhat shorter than that described in connection with Figs. 3 and 4. To each end of conductor 50 I attach a clamp element 8 as before, and at substantially the mid point of said conductor I attach a contact wire clamp element 35. These lacing sections are preferably made in two standard sizes, each identical with the other, except that one is slightly longer than the other. This longer section is used for those sections whose contact wire clamp 35 is located directly beneath the point of attachment of a hanger 3 to the feed cable 4. This arrangement is necessary due to the fact that the points where hangers 3 connect to cable 4, are higher than any other point of the feeder cable, and the slight increase in length of the aforementioned cable sections permits the respective contact wire clamps directly beneath the hangers to drop to a point in alignment with the other contact wire clamps, and thereby cause all of said contact wire clamps to lie tangent to a line which is parallel with the track beneath the system. These lacing sections are installed in the same manner as previously described.

Attention is called to the fact that although a sectional type of lacing is used, the number of clamp joints is considerably less than when a continuous lacing is used. In the form of lacing shown in Figs. 3 and 4 there are five clamp joints in the section. A corresponding section or portion of a continuous lacing employs in some instances as high as ten clamp joints as it is necessary to clamp the lacing conductor as well as the feeder cable and contact wire. In the form of lacing shown in Figs. 5 and 6 there are only three clamp joints while a corresponding section or portion of a continuous lacing employs in some instances as high as six clamp joints. It is thus evident that I have reduced the number of clamp joints substantially 50% in the system and hence the conductivity of the system as a whole is materially increased. The use of my sectional type of lacing greatly expedites the erection of the system as the lacing sections are easily handled and may be accurately clamped in position.

It will be understood that the terms cable and wire are used in the specification and claims to include any conductor, either solid or stranded or both solid and stranded and such terms are used merely to differentiate one conductor from other conductors in the system.

Having thus described my invention, what I claim is:—

1. The combination with an overhead catenary system, of a contact wire adapted to be supported from said system, and a continuous lacing connecting said wire to said system, said lacing being composed of a plurality of sections.

2. The combination with an overhead catenary system, of a contact wire adapted to be supported from said system, a continuous flexible lacing connecting said wire to said system, said lacing being composed of a plurality of sections detachably connected together, and means for connecting each of said sections to said system and said contact wire.

3. The combination with an overhead catenary system, of a contact wire adapted to be supported from said system, a flexible lacing connecting said wire to said system, said lacing being composed of a plurality of sections, and means integrally connected with each of said sections for connecting said contact wire to said system and for connecting said sections together.

4. The combination with an overhead catenary system, of a contact wire adapted to be supported from said system, a continuous flexible lacing connecting said wire to said system, said lacing being composed of a plurality of sections detachably connected together, and each section having a plurality of clamp elements permanently connected thereto.

5. The combination with an overhead catenary system, of a contact wire adapted to be supported from said system, a flexible lacing connecting said wire to said system, said lacing being composed of a plurality of sections, and each section having a plurality of clamp elements connected thereto, the clamp elements of one section being adapted to cooperate with the clamp element of an adjacent section to form a substantially continuous lacing.

6. The combination with an overhead catenary system comprising a cable hung to define a plurality of catenary loops, of a contact wire adapted to be supported from said cable, a flexible lacing connecting said wire to said cable, said lacing being composed of a plurality of sections, and each section having a plurality of clamp elements integrally connected thereto, the clamp elements at each end of one section being adapted to cooperate with the clamp elements of adjacent sections to form a unit clamp device and define a substantially continuous lacing.

7. The combination with an overhead catenary system comprising a cable having to define a plurality of catenary loops, of a plurality of contact wires supported from said cable and arranged to define a series of freely suspended overlapping loops, a lacing connecting said contact wires to said cable, said lacing being composed of a plurality of sections, and each of said sections having a plurality of clamp elements integrally connected thereto, said clamp elements being adapted to be connected alternately to said cable and said contact wires.

8. The combination with an overhead catenary system comprising a suspension cable, a plurality of hangers depending from said cable, a feeder cable supported by said hangers and defining a plurality of catenary loops, a contact wire, and a continuous lacing supporting said contact wire from said feeder cable, said lacing being composed of a plurality of sections of predetermined lengths, the length of each of said sections bearing a definite relation to the distance between said hangers thereby to cause said contact wire to lie parallel to the track beneath the system.

9. The combination with an overhead catenary system comprising a suspension cable, a plurality of hangers depending from said cable, a feeder cable supported by said hangers and defining a plurality of catenary loops, a contact wire, a continuous lacing supporting said contact wire, said lacing being composed of a plurality of sections of predetermined lengths, said hangers being spaced apart at predetermined lengths, and said lacing sections being connected to said feeder cable a distance from an adjacent hanger equal to substantially one half the distance between the feeder cable clamps of the lacing section.

10. A lacing section of the character set forth comprising a length of flexible conductor, and a plurality of clamp elements permanently connected to said conductor, certain of said clamp elements having portions adapted to cooperate with the clamp elements of adjacent sections to define a unit clamp.

11. A lacing section of the character set forth comprising a length of flexible conductor, and a plurality of clamp elements drop forged on said conductor at predetermined distances apart, to provide a homogeneous and permanent electrical connection between said conductor and clamp elements.

12. A lacing section of the character set forth comprising a length of flexible conductor, and a plurality of clamp elements integrally connected to said conductor, certain of said elements being adapted to engage a catenary cable, other of said elements being adapted to engage a contact wire, said cable engaging elements and wire engaging elements being arranged in alternated relation and at predetermined distances along said conductor, and the clamp elements adjacent each end of said section having portions adapted to cooperate with similar elements on adjacent sections to define a continuous lacing.

13. A lacing section of the character set forth comprising a length of flexible conductor, a cable engaging clamp element integrally connected to each end of said conductor, said clamp elements being adapted to cooperate with an adjacent section to define a unit clamp, and a contact wire engaging clamp element integrally connected to said conductor intermediate the first mentioned clamp elements.

14. A lacing section of the character set forth comprising a length of flexible conductor, a cable engaging clamp element integrally connected to each end of said conductor to provide a permanent and homogeneous electrical connection therewith, a hook formed on each of said elements, and a contact wire engaging element integrally connected to said conductor to provide a permanent and homogeneous electrical connection therewith.

15. A lacing section of the character set forth comprising a predetermined length of flexible conductor, a cable engaging clamp element integrally connected to each end of said conductor, a third cable engaging clamp element integrally connected to said conductor substantially midway between the end clamp elements, and a contact wire clamp element integrally connected to said conductor substantially midway between each end clamp element and said third cable clamp element.

In testimony whereof, I hereunto affix my signature.

HENRY B. P. WRENN.